United States Patent [19]

Clerici et al.

[11] Patent Number: 4,902,591

[45] Date of Patent: Feb. 20, 1990

[54] LEAD ACCUMULATOR WITH GAS RECOMBINATION

[75] Inventors: Guido Clerici, Milan; Mario Maja, Turin, both of Italy

[73] Assignee: Industrie Magneti Marelli S.r.l., Milan, Italy

[21] Appl. No.: 186,255

[22] Filed: Apr. 26, 1988

[30] Foreign Application Priority Data

Jul. 21, 1987 [IT] Italy ............................... 67636 A/87

[51] Int. Cl.⁴ .......................................... H01M 10/08
[52] U.S. Cl. ..................................... 429/204; 429/57; 429/225
[58] Field of Search ............... 429/204, 205, 203, 188, 429/189, 225, 57

[56] References Cited

U.S. PATENT DOCUMENTS

| | | | |
|---|---|---|---|
| 2,023,717 | 12/1935 | Willimek | 429/205 X |
| 2,649,766 | 8/1953 | Johnson | 429/205 X |
| 3,862,861 | 1/1975 | McClelland. | |

FOREIGN PATENT DOCUMENTS

WO8101078 4/1981 European Pat. Off. .

*Primary Examiner*—Anthony Skapars
*Attorney, Agent, or Firm*—Sughrue, Mion, Zinn, Macpeak & Seas

[57] ABSTRACT

In a gas-recombination lead accumulator, the electrolyte includes additives selected from the group consisting of ions of tin, selenium and bismuth and/or organic molecules selected from the group consisting of n-dodecylamine, 2,3,4-trimethoxybenzaldehyde, 3,5-diaminobenzoic acid, nicotinic acid and their sodium, potassium and magnesium salts. The presence of the aforesaid additives has the effect of inhibiting the discharge of hydrogen and/or promoting the reduction of oxygen at the negative electrode.

3 Claims, No Drawings

LEAD ACCUMULATOR WITH GAS RECOMBINATION

The present invention relates to a lead accumulator of the gas-recombination type with a sulphuric acid electrolyte.

There is a widely known technique which enables maintenance-free lead/sulphuric acid accumulators to be produced in which the small quantity of electrolyte absorbed by the separators prevents any discharge thereof.

The general structural principles on which accumulators of this type are based involve:

the facility for the oxygen evolved during the charging phase (not exceeding a voltage limit at the positive electrode) to recombine at the negative electrode; this is achieved by facilitating the migration of oxygen by diffusion from the positive electrode to the negative electrode by the use of separators in which the electrolyte is absorbed into the fibres, leaving channels and spaces through which the gas can reach the spongy lead;

the proportioning of the positive/negative active mass ratio so as to avoid overcharging of the negative masses; this is achieved by the use of negative plates with a greater capacity than that of the positive plates so that an appreciable production of hydrogen is avoided and oxygen is evolved at the positive electrode during overcharging.

This second condition, however, involves limitations due, in particular, to the degradability of the positive active material with time, particularly in accumulators in which the support/rheophore grids are of lead alloys with no antimony or with a content thereof of less than 1%. The degradation of the positive active material with time is accelerated by operation in cycles with complete discharge and recharging. It is then necessary to provide a larger positive active mass than that needed for the discharge capacity. This necessarily leads to a corresponding over-sizing of the negative active material, without which the electrode would reach undesirable voltages with evolution of hydrogen. The result is a heavy and expensive accumulator.

In practice, though accumulators of the aforesaid type are incorrectly defined as "hermetic", the evolution of a certain quantity of hydrogen cannot be avoided even in open circuit. In order to enable the hydrogen produced to be released, the accumulator is generally provided with a calibrated over-pressure valve which enables the hydrogen evolved to escape when the internal pressure exceeds a predetermined value.

It is known that the reaction kinetics of the gases at the electrodes can be affected by the presence of additives constituted by metal ions and/or organic molecules in the electrolyte. Some of these substances slow the production of hydrogen at the negative electrode, others accelerate the combination of the oxygen and yet others increase the rate of recombination of the hydrogen at the positive electrode.

The present invention is based on the discovery that a few specific additives, when introduced into the electrolyte, accelerate the reduction of oxygen and depress the evolution of hydrogen at the same time.

The subject of the present invention is therefore a lead accumulator with gas recombination and an acid electrolyte, characterised in that the electrolyte includes additives selected from the group consisting of tin, selenium and bismuth ions, or organic molecules selected from the group consisting of n-dodecylamine, 2,3,4-trimethoxybenzaldehyde, 3,5-diaminobenzoic acid, nicotinic acid and their sodium, potassium or magnesium salts.

In particular the introduction of the organic molecules selected from the aforesaid group into the electrolyte has an appreciable effect in inhibiting the discharge of hydrogen. 3,5-diaminobenzoic acid also has a marked effect in promoting the reduction of oxygen at the negative electrode.

The presence of tin, selenium and bismuth ions has a positive action in that it accelerates the reduction of oxygen and depresses the evolution hydrogen. The introduction of these additives into the electrolyte, possibly in combination with each other, thus enables electrodes to be produced with less weight for a given performance and batteries to be produced with a longer life by virtue of their reduced water consumption.

A further advantage lies in the fact that the hydrogen concentration can be raised to densities of more than 1.3. It is, in fact, known that the lead is sulphated even in open circuit, the reaction being dependent on the sulphuric acid concentration and on the temperature. Since the quantity of sulphuric acid available in a recombination accumulator is limited by the essential presence of channels to allow the passage of oxygen, it is desirable to increase the acid concentration to a density of more than 1.28 and to use substances which inhibit the evolution of hydrogen and which are selected from the aforesaid group to enable the acid concentration to be increased even further, thus improving the discharge capacity of the accumulator.

According to the invention, the tin, selenium and bismuth ions are introduced into the electrolyte in the form of salts (typically sulphates) or oxides. Their concentration in the electrolyte is typically of the order of 100 to 1000 ppm. The organic compounds selected from the aforesaid group are typically present in concentrations of the order of 50 to 1500 ppm.

The positive effect of the presence of the metal ions selected from the aforesaid group has been confirmed by the following experimental tests.

EXAMPLE 1

Negative plates were used which were produced from expanded lead-calcium-tin grids coated with pure lead oxide by a conventional process. After aging at low temperature, the plates were formed with the use of sheets of pure lead as the anode in a very pure solution of sulphuric acid (density 1.06 kg/liter). The conversion was effected with a constant current over a period of 46 hours, the charging current being 45 Ah per negative plate. After formation, the plates were washed in distilled water and dried in argon.

The negative plates were subjected to cycles of charging and discharging with a sheet of pure lead as the other electrode and in sulphuric acid with a density of 1.28 kg/liter and containing a known quantity of the additive under test. Analytical-grade reagents were used and the additives were added as sulphates or oxides dissolved in sulphuric acid.

Each plate was subjected to 10 cycles of charging and discharging with a current. After these cycles, each plate was removed from the cell in the charged condition, allowed to drip for one minute and then sealed in a glass container. During the cycles, the internal pressures of the containers, which were kept at a constant temperature of 40° C., were measured by means of the measuring apparatus described in the articles by A. Arlanch et al. in "Power Sources 10", ed. L. J. Pearce, The Paul Press Ltd., 1985, Page 495 and by M. Maja et al. in "Proceedings of The 6th European Symp. on Corrosion Inhibitors, Ferrara (Italy) September 1985, page 427.

The experimental pressure data conformed to the expression:

$$P = P_0 \cdot (\exp(-D/P_0 \cdot t) - 1) + B \cdot \sqrt{t + t0,}$$

in which the parameters D, B, to and P0 are parameters which depend on the experimental conditions. The parameters D and B are related to the rates of consumption of oxygen and of production of hydrogen respectively.

The effect of the additives was evaluated by the following parameters:

$KO = (D - D_0)/D_0$, relating to the oxygen consumption.

$KH = (B - B/D_0)/D_0$ relating to the production of hydrogen in which $D_0$ and $B_0$ are the values of D and B for plates subjected to cycles in the absence of additives. A positive value of KO or KH thus indicates a promoting action on the processes involving oxygen and hydrogen respectively, whilst a negative value corresponds to an inhibiting effect.

The values of the parameters KO and KH determined for tin, bismuth and selenium in 100 ppm concentration in the electrolyte are given in the table.

TABLE

| element | concentration (ppm) | KO | KH |
|---------|---------------------|------|-------|
| Sn      | 100                 | 0.86 | −0.4  |
| Bi      | 100                 | 0.12 | −0.3  |
| SE      | 100                 | 0.1  | −0.05 |

The tests carried out thus show that these elements inhibit the evolution of hydrogen and increase the reduction of oxygen simultaneously.

EXAMPLE 2

Further tests were carried out with tin and bismuth ions in combination in concentrations of from 100 to 1000 ppm in the electrolyte and with the simultaneous use of the sodium salt of 3,5-diaminobenzoic acid in concentrations of from 10 to 300 ppm. It was found that the evolution of hydrogen was inhibited and the rate of recombination of oxygen, was increased.

EXAMPLE 3

A similar positive effect was found with the synergic use of tin and selenium ions in quantities of from 100 to 1000 ppm and with the simultaneous use of 2,3,4-trimethoxybenzaldehyde in concentrations of from 50 to 300 ppm and of the sodium salt of nicotinic acid in concentrations of from 100 to 1500 ppm.

What is claimed is:

1. A normally sealed lead accumulator with gas recombination and an acid electrolyte, wherein said electrolyte includes at least one additive selected from the group consisting of organic compounds n-dodecylamine, 2,3,4-trimethoxybenzaldehyde and 3,5-diaminobenzoic acid, and wherein said at least one additive is present in said electrolyte in concentrations of from 50 to 1500 ppm.

2. A normally sealed lead accumulator with gas recombination and an acid electrolyte, wherein said electrolyte includes tin and bismuth ions in concentration of from 100 to 1000 ppm in combination with a sodium, potassium or magnesium salt of 3,5-diaminobenzoic acid in concentration of from 10 to 300 ppm.

3. A normally sealed lead accumulator with gas recombination and an acid electrolyte, wherein said electrolyte comprises tin and selenium ions in concentration of from 100 to 1000 ppm in combination with 2,3,4-trimethoxybenzaldehyde in concentration of from 50 to 300 ppm and a sodium, potassium or magnesium salt of nicotinic acid in concentration of from 100 to 500 ppm.

* * * * *